Figure 3:
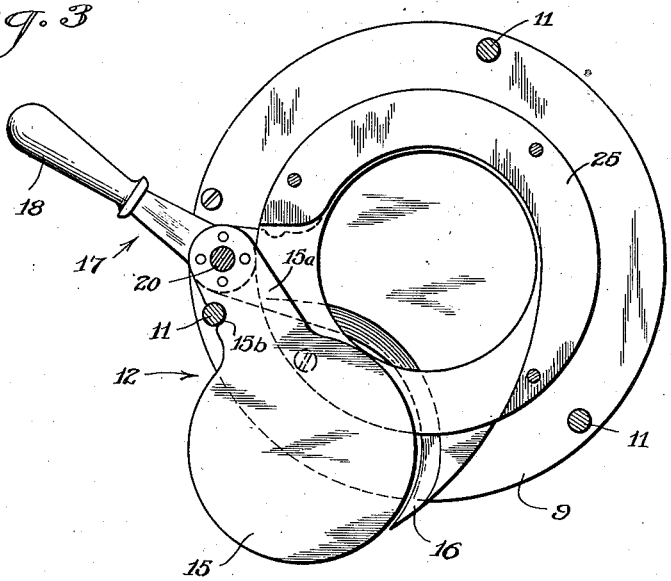

Dec. 7, 1937.   S. D. ROSENSTONE ET AL   2,101,755
SLICING MACHINE
Filed Oct. 11, 1935   2 Sheets-Sheet 1
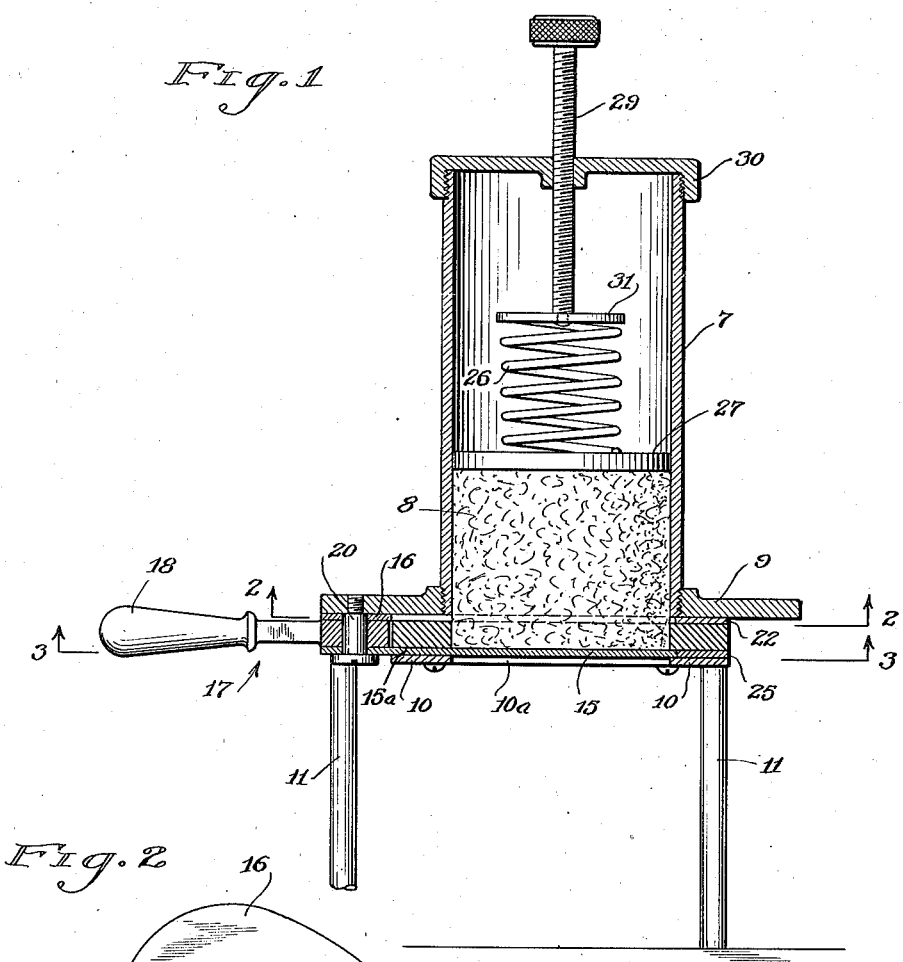
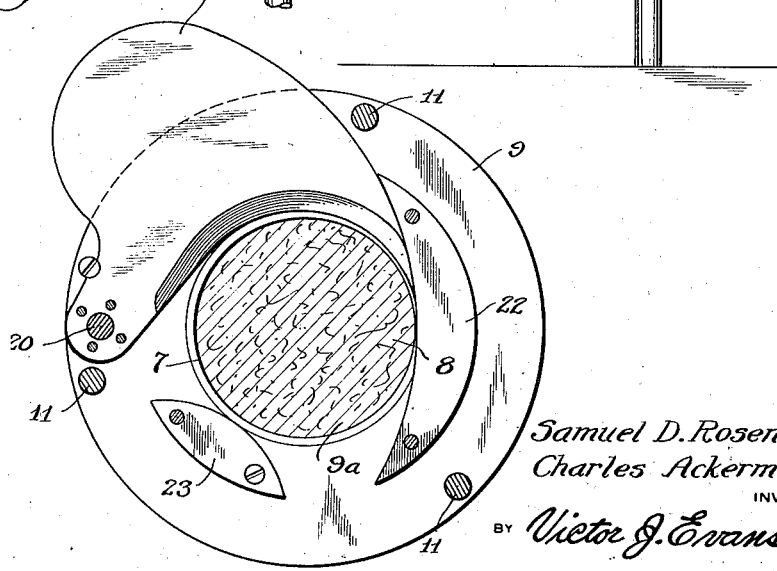
Samuel D. Rosenstone
Charles Ackerman
INVENTORS
BY Victor J. Evans & Co.
ATTORNEY Dec. 7, 1937. S. D. ROSENSTONE ET AL 2,101,755
SLICING MACHINE
Filed Oct. 11, 1935  2 Sheets-Sheet 2

Samuel D. Rosenstone
Charles Ackerman
INVENTORS
BY Victor J. Evans & Co.
ATTORNEY Patented Dec. 7, 1937

2,101,755

UNITED STATES PATENT OFFICE 2,101,755

SLICING MACHINE

Samuel D. Rosenstone, Passaic, and Charles Ackerman, Hackensack, N. J.

Application October 11, 1935, Serial No. 44,624

2 Claims. (Cl. 146—63)

This invention relates to a machine particularly intended to form patties or cakes from ground food and particularly from ground meat such as hamburger and so forth.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In the drawings:

Fig. 1 is a view partly in section and partly in elevation of the machine of our invention.

Figure 4:
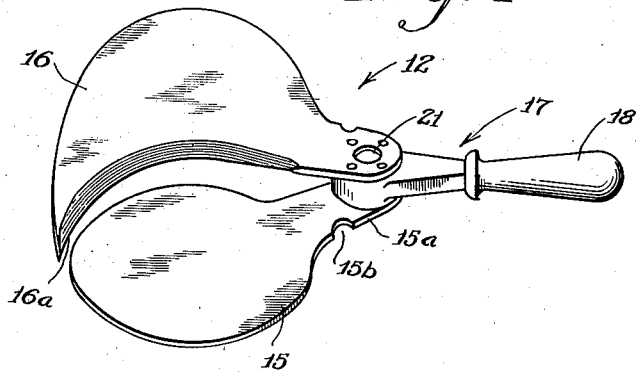

Figs. 2 and 3 are sections taken respectively on lines 2—2 and 3—3 of Fig. 1, looking in the direction of the arrows, the former figure showing the cutting blade prior to a cutting stroke and the latter figure showing the same blade after a cutting stroke; and Fig. 4 is a perspective view showing a closure plate and a cutting blade connected to a lever by means of which the mentioned plate and blade are simultaneously operated.

Referring to the drawings for a more detailed description thereof, the numeral 7 indicates a container, shown as a cylinder, and adapted to hold a body 8 of hamburger or other ground food. The base of the machine comprises an upper annular plate 9 into which the cylinder 7 is threadedly secured and a lower annular plate 10 spaced from the upper plate and held in fixed relation thereto. Said plates 9 and 10 have central apertures 9a and 10a, respectively, concentric with the cylinder 7. The machine is mounted on legs 11. The unit 12, shown in Fig. 4, is pivotally secured to and positioned between the plates 9 and 10. Said unit 12 comprises a bottom closure or gate 15 for the cylinder 7, a cutting blade 16 having a sharp concave edge 16a, and a lever 17 provided with a handle 18. The plate 15 and the blade 16 are rigidly secured to opposite faces of the inner end of the lever 17 and are thereby spaced apart a distance equal to the thickness of the slice which is to be cut from the material compressed in the cylinder 7. The plate 15 is circular and is attached to the lever 17 by means of an arm 15a, in one side of which there is a notch 15b, the purpose of which will be hereinafter explained. Said plate 15 is adapted to open and close the lower or discharge end of the cylinder 7 and the cutting blade 16 is likewise adapted to open and close the discharge end of the cylinder. As shown, the gate 15 and the blade 16 are offset relative to each other so that one begins to close as the other begins to open and the one is fully closed when the other is fully open. Both the mentioned plate 15 and the blade 16 are simultaneously actuated by the manual operation of the lever 17, which, in the operation of the device, is oscillated in a horizontal plane on a pivot 20 which secures the unit 12 to the upper plate 9, passing thru an aperture 21 formed in said unit, as shown in Fig. 4. Arcuate spacer plates 22 and 23, of a form clearly shown in Fig. 2, are secured to the lower face of the plate 9, being of substantially the same thickness as the blade 16 and disposed in the same horizontal plane. A lower spacer plate 25 is secured to the upper face of the lower annular plate 10 and is coplanar with the closure or gate 15.

Pressure is exerted on the hamburger or other ground food by a helical spring 26 pressing on a plate 27 which has a diameter substantially equal to the internal diameter of the cylinder 7. The compression of said spring may be regulated by means of a screw 29 which passes centrally thru the removable cap 30 of the cylinder and threadedly engages the cap and is secured at its lower end to a plate 31 which presses down on the top of the spring 26.

In operating the device for the purpose of forming patties or cakes from the hamburger or other food contained in the cylinder, the lever 17 is first positioned so that the blade 16 is to one side of the cylinder, the gate or closure plate 15 being then in closed position so that the food is pressed by the spring 26 down onto the gate 15. The lever 17 is then swung laterally so that the blade 16 cuts a patty or cake of a thickness equal to the distance between the gate 15 and the cutting blade 16, during which cutting operation the gate 15 swings to open position to allow the patty to drop thru the lower annular ring 10 and the blade 16 moves to a position closing the discharge end of the cylinder. The lever 17 is then swung in the opposite direction until the blade is in open, and the gate in closed, position, to allow the food to be pressed down onto the gate.

It will thus be seen that we have provided a simple and efficient device for forming patties or cakes from hamburger or other food and that the product may thus be formed in a way which is more sanitary than is a manual formation of the same.

What is claimed as new is:

1. A device of the character described, comprising a container adapted to receive material to be cut and having a discharge opening, means for urging the material toward said opening, an annular plate threadedly secured to the discharge end of said container, a second annular plate secured to and spaced from said first mentioned plate, a substantially circular plate adjacent said last mentioned annular plate for opening and closing the discharge opening of the container, a cutting blade positioned above and offset at an angle to said circular plate and horizontally disposed between said first annular plate and said second annular plate and adapted to be swung under the contents of the container to support same when the plate moves away, means for pivotally mounting said blade and plate on a common pivotal point and means for simultaneously swinging said blade and plate.

2. A device of the character described, comprising a container adapted to receive material to be cut and having a discharge opening, means for urging the material toward said opening, an annular plate threadedly secured to the discharge end of said container, a second annular plate secured to and spaced from said first mentioned plate, arcuate spacer plates attached to the lower face of said first mentioned annular plate to space the farther side of the first plate from the rest of the mechanism, a substantially circular plate adjacent said last mentioned annular plate for opening and closing said discharge opening of the container, a cutting blade positioned between said annular plates and lying at an angle to said circular plate, said circular plate and blade having a reduced end for pivotal connection to a handle whereby said plate and blade are mounted on a common pivotal point, said pivotal point uniting all the plates on one side of the mechanism, actuation of the handle, moving the blade and plate simultaneously.

SAMUEL D. ROSENSTONE.
CHARLES ACKERMAN.